United States Patent
Sherman et al.

(10) Patent No.: US 10,239,301 B2
(45) Date of Patent: Mar. 26, 2019

(54) HEAT-ACTIVATABLE SILOXANE-BASED ADHESIVES

(71) Applicant: 3M INNOVATIVE PROPERTIES COMPANY, St. Paul, MN (US)

(72) Inventors: Audrey A. Sherman, Woodbury, MN (US); Baris Yalcin, Woodbury, MN (US); Ibrahim S. Gunes, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 403 days.

(21) Appl. No.: 14/572,993

(22) PCT Filed: Jun. 26, 2013

(86) PCT No.: PCT/US2013/047908
§ 371 (c)(1),
(2) Date: Dec. 17, 2014

(87) PCT Pub. No.: WO2014/008064
PCT Pub. Date: Jan. 9, 2014

(65) Prior Publication Data
US 2015/0152294 A1 Jun. 4, 2015

Related U.S. Application Data

(60) Provisional application No. 61/667,651, filed on Jul. 3, 2012.

(51) Int. Cl.
| | | |
|---|---|---|
| *B32B 3/10* | (2006.01) | |
| *B32B 37/12* | (2006.01) | |
| *C09J 183/10* | (2006.01) | |
| *C09J 5/06* | (2006.01) | |
| *C09J 183/08* | (2006.01) | |
| *C09J 7/35* | (2018.01) | |
| *C09J 7/10* | (2018.01) | |
| *C08G 77/455* | (2006.01) | |

(52) U.S. Cl.
CPC ...... *B32B 37/1207* (2013.01); *B32B 37/1292* (2013.01); *C09J 5/06* (2013.01); *C09J 7/10* (2018.01); *C09J 7/35* (2018.01); *C09J 183/08* (2013.01); *C09J 183/10* (2013.01); *C08G 77/455* (2013.01); *C09J 2201/122* (2013.01); *C09J 2201/61* (2013.01); *C09J 2483/00* (2013.01); *Y10T 428/24843* (2015.01); *Y10T 428/2826* (2015.01)

(58) Field of Classification Search
None
See application file for complete search history.

(56) References Cited

U.S. PATENT DOCUMENTS

| | | | |
|---|---|---|---|
| 4,816,333 A | 3/1989 | Lange | |
| 4,900,474 A | 2/1990 | Terae | |
| 5,028,679 A | 7/1991 | Terae | |
| 5,118,775 A | 6/1992 | Inomata | |
| 5,214,119 A | 5/1993 | Leir | |
| 5,223,465 A | 6/1993 | Ueki | |
| 5,236,997 A | 8/1993 | Fujiki | |
| RE34,605 E | 5/1994 | Schrenk | |
| 5,360,659 A | 11/1994 | Arends | |
| 5,461,134 A | 10/1995 | Leir | |
| 5,512,650 A | 4/1996 | Leir | |
| 5,579,162 A | 11/1996 | Bjornard | |
| 5,585,186 A | 12/1996 | Scholz | |
| 5,753,373 A | 5/1998 | Scholz | |
| 5,866,222 A | 2/1999 | Seth | |
| 5,873,931 A | 2/1999 | Scholz | |
| 5,882,774 A | 3/1999 | Jonza | |
| 6,049,419 A | 4/2000 | Wheatley | |
| 6,123,890 A | 9/2000 | Mazurek | |
| 6,224,710 B1* | 5/2001 | Rinde | C08G 59/18 156/310 |
| 6,664,359 B1 | 12/2003 | Kangas | |
| 7,153,924 B2 | 12/2006 | Kuepfer | |
| 7,374,812 B2 | 5/2008 | Mizuno | |
| 7,695,818 B2 | 4/2010 | Sherman | |
| 7,947,376 B2* | 5/2011 | Sherman | C08G 69/42 428/141 |
| 8,124,169 B2 | 2/2012 | Ylitalo | |
| 8,734,939 B2* | 5/2014 | Herr | C08G 18/10 156/329 |
| 8,742,022 B2 | 6/2014 | Pokorny | |
| 2005/0282024 A1* | 12/2005 | Sherman | C09J 183/10 428/447 |
| 2007/0148475 A1 | 6/2007 | Sherman | |
| 2008/0318059 A1 | 12/2008 | Sherman | |

(Continued)

FOREIGN PATENT DOCUMENTS

| | | |
|---|---|---|
| WO | WO 1996-34028 | 10/1996 |
| WO | WO 1996-34030 | 10/1996 |

(Continued)

OTHER PUBLICATIONS

Bragg, "The Form Birefringence of Macromolecules", Acta Cryst., 1953, vol. 6, pp. 865-867.

(Continued)

*Primary Examiner* — Christopher M Polley
(74) *Attorney, Agent, or Firm* — Jeffrey M. Olofson

(57) ABSTRACT

Heat-activatable siloxane-based adhesive articles include a substrate and a heat-activatable adhesive layer that includes a hot melt processable siloxane-based elastomeric polymer. The siloxane-based elastomeric polymer is a urea-containing segmented copolymer or an oxamide-containing segmented copolymer. The adhesive layers are substantially free of tackifying resins and are non-tacky and non-adhesive until heated to a temperature of at least 50 C. The adhesive layers may be optically clear and may have a microstructured surface.

22 Claims, No Drawings

(56) References Cited

U.S. PATENT DOCUMENTS

| | | | |
|---|---|---|---|
| 2010/0221511 A1* | 9/2010 | Benson | G02B 5/0841 |
| | | | 428/212 |
| 2011/0092638 A1* | 4/2011 | Leir | C08G 69/00 |
| | | | 524/588 |
| 2011/0262672 A1 | 10/2011 | Lavallee | |
| 2012/0270980 A1 | 10/2012 | Pokorny | |

FOREIGN PATENT DOCUMENTS

| | | |
|---|---|---|
| WO | WO 1996-35458 | 11/1996 |
| WO | WO 1997-40103 | 10/1997 |
| WO | WO 1998-17726 | 4/1998 |
| WO | WO 2011034839 | 3/2011 |
| WO | WO 2011-091026 | 7/2011 |
| WO | WO 2013-052319 | 4/2013 |
| WO | WO 2014-008148 | 9/2014 |

OTHER PUBLICATIONS

Smith, "Modern Optical Engineering The Design of Optical Systems", 104-110 (1966).

International Search Report for PCT International Application No. PCT/US2013/047908 dated Sep. 25, 2013, 4 pages.

\* cited by examiner

HEAT-ACTIVATABLE SILOXANE-BASED ADHESIVES

CROSS REFERENCE TO RELATED APPLICATIONS

This application is a national stage filing under 35 U.S.C. 371 of PCT/US2013/047908, filed Jun. 26, 2013, which claims priority to U.S. Provisional Application No. 61/667,651, filed Jul. 3, 2012, the disclosure of which is incorporated by reference in its/their entirety herein.

FIELD OF THE DISCLOSURE

The present disclosure relates generally to the field of adhesives, specifically heat-activatable adhesives that are siloxane-based.

BACKGROUND

Adhesives have been used for a variety of marking, holding, protecting, sealing and masking purposes. Adhesive tapes generally comprise a backing, or substrate, and an adhesive. Among the types of adhesives used in tapes, are pressure sensitive adhesives and heat-activatable adhesives, with pressure sensitive adhesives being the more common.

Pressure sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers and silicones. Each of these classes of materials has advantages and disadvantages.

Heat-activatable adhesives are non-tacky at room temperature but become tacky and capable of bonding to a substrate at elevated temperatures. These adhesives usually have a $T_g$ (glass transition temperature) or melting point ($T_m$) above room temperature. When the temperature is elevated above the $T_g$ or $T_m$, the storage modulus usually decreases and the adhesive becomes tacky.

A number of siloxane-based pressure sensitive adhesives have been described. A number of these siloxane-based pressure sensitive adhesives contain segmented siloxane copolymers, including silicone polyurea block copolymers and polydiorganosiloxane polyoxamide block copolymers. Silicone polyurea block copolymers are disclosed in, e.g., U.S. Pat. Nos. 5,512,650, 5,214,119, 5,461,134, and 7,153,924 and PCT Publication Nos. WO 96/35458, WO 98/17726, WO 96/34028, WO 96/34030 and WO 97/40103. Polydiorganosiloxane polyoxamide block copolymers are described, for example, in US Patent Publication No. 2007/0148475. These polymeric materials are typically non-adhesive materials, often having release properties, and are formulated with silicate tackifying resins (such as MQ resins) to produce pressure sensitive adhesives.

Additionally, U.S. Pat. No. 5,866,222 (Seth et al.) describes the modification of silicone polyurea release coatings to give non-tacky coatings with higher release values to, for example, block copolymer-based pressure sensitive adhesives, through the use of 1 to 30 weight percent of MQ tackifying resin.

SUMMARY

Disclosed herein are heat-activatable adhesive articles, including heat-activatable transfer tapes, and methods of preparing heat-activatable adhesive articles.

In some embodiments, heat activatable adhesive articles comprise a substrate with a first surface and a second surface and a heat-activatable adhesive layer disposed on at least a portion of the first surface of the substrate. The heat-activatable adhesive layer comprises a hot melt processable siloxane-based elastomeric polymer, where the siloxane-based elastomeric polymer comprises a segmented copolymer of Formula 1 or Formula 2:

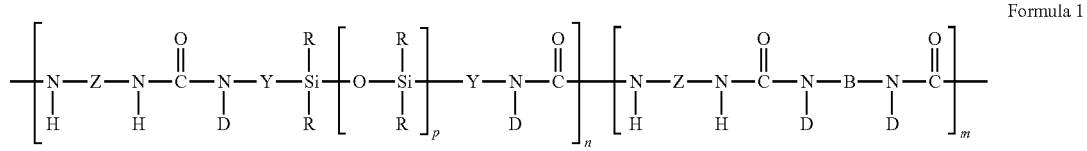

Formula 1 where each R is a moiety that, independently, is an alkyl moiety, having about 1 to 12 carbon atoms, and may be substituted with, for example, trifluoroalkyl or vinyl groups, a vinyl radical or a higher alkenyl radical, a cycloalkyl moiety having from about 6 to 12 carbon atoms and may be substituted with alkyl, fluoroalkyl, and vinyl groups, or an aryl moiety having from about 6 to 20 carbon atoms and may be substituted; each Z is a polyvalent radical that is an arylene radical or an aralkylene radical having from about 6 to 20 carbon atoms, an alkylene or cycloalkylene radical having from about 6 to 20 carbon atoms; each Y is a polyvalent radical that independently is an alkylene radical of 1 to 10 carbon atoms, an aralkylene radical or an arylene radical having 6 to 20 carbon atoms; each D is selected from the group consisting of hydrogen, an alkyl radical of 1 to 10 carbon atoms, phenyl, and a radical that completes a ring structure including B or Y to form a heterocycle; where B is a polyvalent radical selected from the group consisting of alkylene, aralkylene, cycloalkylene, phenylene, heteroalkylene, and copolymers and mixtures thereof; m is a number that is 0 to about 1000; n is a number that is at least 1; and p is a number that is at least 10, in some embodiments 15 to about 2000, or even 30 to 1500;

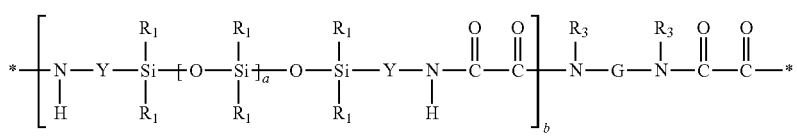

Formula 2 where each $R_1$ is independently an alkyl, haloalkyl, aralkyl, alkenyl, aryl, or aryl substituted with an alkyl, alkoxy, or halo; each Y is independently an alkylene, aralkylene, or a combination thereof; subscript a is independently an integer of 40 to 1500; subscript b is an integer of 1 to 10; G is a divalent group that is the residue unit that is equal to a diamine of formula $R_3HN\text{-}G\text{-}NHR_3$ minus the two —$NHR_3$ groups; each $R_3$ is hydrogen or an alkyl having 1 to 10 carbon atoms, or $R_3$ taken together with G and with the nitrogen to which they are both attached forms a heterocyclic group; each asterisk (*) indicates a site of attachment of the repeat unit to another group in the copolymer.

The heat-activatable adhesive is non-tacky and non-adhesive to substrates at a temperature of less than 50° C. and is adhesive to substrates at a temperature of greater than 50° C. up to a temperature of 10° C. below the decomposition temperature of the siloxane-based elastomeric polymer. In some embodiments, the heat-activatable adhesive is substantially free of tackifying resin and in some embodiments the heat-activatable adhesive is optically clear.

Also disclosed are heat-activatable transfer tapes. In some embodiments, the heat-activatable transfer tape comprises: an optically transparent heat-activatable adhesive layer with a first major surface and a second major surface, the optically transparent heat-activatable adhesive layer comprising the siloxane-based elastomeric polymers describe above, where at least one of the first major surface or the second major surface comprises a microstructured pattern on the surface such that the microstructured pattern is a permanent feature of the adhesive surface, and where the microstructured surface alters the direction of light. In some embodiments, the heat-activatable adhesive layer has refractive index in the range of 1.4-1.8.

Also disclosed are methods of preparing adhesive articles. In some embodiments, the method comprises providing a first substrate with a first surface and a second surface; providing a heat-activatable adhesive, where the heat-activatable adhesive comprises a hot melt processable siloxane-based elastomeric polymer as described above; heating the heat-activatable adhesive to a temperature of greater than 50° C. up to a temperature of 10° C. below the decomposition temperature of the siloxane-based elastomeric polymer; applying the heat-activatable adhesive to at least a portion of the surface of the first substrate; and cooling the heat-activatable adhesive to room temperature.

In some embodiments the method further comprises contacting a second substrate to the applied heat-activatable adhesive prior to cooling. In other embodiments, the method further comprises contacting a second substrate to the heat-activatable adhesive after cooling, and heating the heat-activatable adhesive to temperature of greater than 50° C. up to a temperature of 10° C. below the decomposition temperature of the siloxane-based elastomeric polymer, either prior to contacting the second substrate to the heat-activatable adhesive or after contacting the second substrate to the heat-activatable adhesive. In some specific embodiments, the first substrate comprises a microstructured release liner and the second substrate comprises a light guide, and the method further comprises cooling the heat-activatable adhesive and removing the first substrate to expose a microstructured surface.

DETAILED DESCRIPTION

The use of adhesives in areas such as the medical, electronic and optical industries is increasing. The term "adhesive" as used herein refers to polymeric compositions useful to adhere together two adherends. Examples of adhesives are pressure sensitive adhesives and heat-activatable adhesives.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Much adhesive development work has been done to develop new classes of materials that are suitable for use as pressure sensitive adhesives. The requirements of, for example, the medical, electronic and optical industries place additional demands upon the pressure sensitive adhesive beyond the traditional properties of tack, peel adhesion and shear strength. New classes of materials are desirable to meet the increasingly demanding performance requirements for pressure sensitive adhesives. The quest for new adhesives, especially pressure sensitive adhesives, has led to new adhesives comprising siloxane polymers. Siloxane polymers have unique properties derived mainly from the physical and chemical characteristics of the siloxane bond. These properties include low glass transition temperature, thermal and oxidative stability, resistance to ultraviolet radiation, low surface energy, hydrophobicity, desirable moisture transmission rates for medical uses, and optical properties such as optical clarity and a refractive index that can be varied as desired. The siloxane polymers, however, often lack tensile strength. The low tensile strength of the siloxane polymers can be improved by forming block copolymers. Some block copolymers contain a "soft" siloxane polymeric block or segment and any of a variety of "hard" blocks or segments.

Typically the siloxane-based elastomeric polymers require tackification to make them pressure sensitive adhesives. Often the levels of added tackifying agent are relatively high, up to 50% by weight of the total adhesive composition (or expressed another way the pressure sensitive adhesive composition can contain equal parts by weight of elastomer and tackifying agent). The resulting pressure sensitive adhesives are often very aggressively tacky and adhere strongly to a wide range of substrate surfaces. While is a desirable feature, handling and processing of these very tacky adhesives can be difficult.

Among the adhesive articles prepared from pressure sensitive adhesives are articles in which a layer of adhesive is disposed on a substrate surface (such as in tapes, labels and the like) and free standing films of adhesive (sometimes called "transfer tapes" as described below).

Adhesive tapes generally have a tape backing with a layer of pressure sensitive adhesive coated on at least a portion of at least one major surface of the backing. Many tapes are supplied as rolls, where the adhesive layer contacts the non-adhesive "back" side of the backing upon being rolled up. Often this non-adhesive surface of the backing has a low adhesion or release coating on it to permit the roll to be unwound. These low adhesion coatings are often called "low adhesion backsizes" or LABs. Many factors control whether an LAB coating is necessary or desirable, including the nature of the adhesive, the composition and topography of the backing, and the desired use for the tape article. For example, some polyolefinic backings have a sufficiently low surface energy that an LAB coating is not required when used with some classes of pressure sensitive adhesives. However, the very aggressive siloxane-based pressures sensitive adhesives nearly always required an LAB coating.

For some tape uses, the presence of LABs can be detrimental. For example, masking tapes are often used to mask areas to be painted. Upon completion of the painting, the masking tape is removed. In some instances, when LAB coatings are used on the masking tape, the paint does not adhere well to the LAB coated surface and can run or flake off to contaminate the painted surface.

Similarly, a variety of tapes are designed to wrap upon themselves in use. Examples of these types of tapes are athletic tapes, duct tapes, electrical tapes, as well as a variety of medical tapes. With these tapes, the LAB coating must provide sufficiently easy release to permit facile unwinding of the tape, and yet must adhere sufficiently strongly to the adhesive to permit the tape to wrapped upon itself and retain the adhesion throughout the period of use of the tape.

Additionally, some tapes, and other articles such as labels, are generally disposed on a release liner. Release liners are typically flexible substrates such as films or sheets that have a low adhesion surface to which pressure sensitive adhesives do not strongly adhere. This permits the release liner to be cleanly removed from the adhesive surface and expose the adhesive surface to permit bonding to an adherend. The low adhesion surface often comprises a coating applied to a film or sheet. Many of these low adhesion coatings are siloxane-based, making them unsuitable for use with siloxane-based adhesives. It is a common tenet in adhesive chemistry that "likes attract likes", and therefore a siloxane-based adhesive will be attracted to a siloxane-based release coating and once in contact the two layers are likely to form such a strong interaction that the release liner cannot be removed from the adhesive surface. Thus, for siloxane-based adhesives, other release chemistries, such as fluorochemical release layers, are generally used. Such release liners are generally much more expensive than siloxane-based release liners.

Double-sided stand-alone layers of adhesive are generally called "transfer tapes". In some transfer tapes, the exposed surfaces are simply the two surfaces of a single adhesive layer. Other transfer tapes are multi-layer transfer tapes with at least two adhesive layers that may be the same or different, and in some instances intervening layers that may not be adhesive layers. Transfer tapes are generally prepared and supplied between two release liners. The release liners not only protect the adhesive surface, but also make it easier to handle the stand alone adhesive film.

Therefore, for many applications it may not be desirable to have to use release coated materials in connection with the adhesive articles. Additionally, there are many applications in which the handling of tacky materials is inconvenient or not feasible. For these applications it may be desirable to have an adhesive that has many of the desirable properties of pressure sensitive adhesives without the room temperature tack. These materials are called heat activated or heat-activatable adhesives. Heat-activatable adhesives are non-tacky at room temperature but become tacky and capable of bonding to a substrate at elevated temperatures. These adhesives usually have a Tg (glass transition temperature) or melting point (Tm) above room temperature. When the temperature is elevated above the Tg or Tm, the storage modulus usually decreases and the adhesive becomes tacky. Typically glass transition temperature (Tg) is measured using Differentially Scanning calorimetry (DSC).

Heat-activatable adhesives are different from conventional hot melt adhesives that typically are, or behave as, thermoplastic materials. Thermoplastic materials are plastics at room temperature, and upon heating they melt and flow and then re-condense upon cooling to re-form the plastic. Often these hot melt adhesives contain crystalline or semi-crystalline polymers. The crystallinity of the polymers gives them cohesive strength at room temperature, but upon melting of the crystallinity, the polymers lose their cohesive strength and readily flow. The heat-activatable adhesives of this disclosure, while hot melt processable, are elastomeric and retain at least some of their cohesive strength upon heating. The heat-activatable adhesives of this disclosure may be heated by a variety of methods. The heat-activatable adhesive can be indirectly heated through the use of an oven, or by being contacted by a heated substrate. The heat-activatable adhesive may also be heated directly through the use of a hot melt mixing apparatus, or the heat-activatable adhesive or the substrates to which the heat activatable adhesive is contacted, may be directly heated through the use of heat guns, flames, surface heaters such as hot plates, IR lamps, and the like.

Disclosed herein is a class of siloxane-based heat-activatable adhesives. These adhesives are not tacky at room temperature but upon heating become tacky and form strong adhesive bonds. In particular, it has been found that these adhesives form strong adhesive bonds with polar surfaces such as metals, glass, and the like.

The heat-activatable adhesives of this disclosure comprise at least one hot melt processable siloxane-based elastomeric polymer. These hot melt processable siloxane-based elastomeric polymers are urea-containing or oxamide-containing siloxane-based elastomeric polymers, and are discussed in greater detail below.

The heat-activatable adhesives of this disclosure do not require tackification. This means that the adhesives of this disclosure are typically free or substantially free of tackifying resin. While tackifying resin can be added to the adhesive as an optional additive, the adhesives of this disclosure do not require tackifying resins to produce strong adhesive bonds. This is quite different from similar pressure sensitive adhesives that typically require high levels of tackifying resin.

Generally the heat-activatable adhesives are non-tacky and non-adhesive to polar substrates such as metals at a temperature of less than 50° C. Typically strong adhesive bonds are formed upon heating at a temperature of greater than 50° C. up to a temperature of 10° C. below the decomposition temperature of the siloxane-based elastomeric polymer.

An additional advantage of the heat-activatable adhesives of this disclosure is their optical properties. Many of the hot melt processable siloxane-based elastomeric polymers of this disclosure are optically clear. Adhesives made from these polymers may be optically clear or optically transparent. Since the adhesives may comprise fillers or additives that can interfere with the transmission of visible light, the adhesives may not be as optically clear as the hot melt processable siloxane-based elastomeric polymers, but may be optically transparent. In many embodiments, the heat-activatable adhesive is optically clear. Additionally, the refractive index of the heat-activatable adhesives is controllable by, for example, varying the hydrocarbon substituents of the siloxane materials. This refractive index control permits the user to match the refractive index or deliberately mismatch the refractive index of the heat-activatable adhesive to a given substrate or surface.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "siloxane-based" as used herein refers to repeat units, to segmented copolymers or units of segmented copolymers that contain at least one silicone unit. The terms silicone or siloxane are used interchangeably and refer to units with dialkyl or diaryl siloxane (—SiR$_2$O—) repeating units.

The term "urea-containing" as used herein refers to macromolecules that are segmented copolymers which contain at least one urea linkage. The urea group has the general structure (—R$^a$N—(CO)—NR$^b$—) where (CO) defines a carbonyl group C=O, and each R$^a$ and R$^b$ is independently a hydrogen or an alkyl group.

The term "oxamide-containing" as used herein refers to macromolecules that are copolymers or segmented copolymers which contain at least one oxamide linkage. The oxamide group has the general structure (—NR$^a$—(CO)—(CO)—NR$^b$—) where (CO) defines a carbonyl group C=O, and R$^a$ and R$^b$ are each hydrogen or an alkyl group.

The term "segmented copolymer" refers to a copolymer of linked segments, each segment constitutes primarily a single structural unit or type of repeating unit. For example, a polyoxyalkylene segmented copolymer may have the following structure:

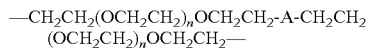

where A is the linkage between the 2 polyoxyalkylene segments, or it may have the following structure:

where A is the linkage between the polyoxyalkylene segment and the B segment.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example,

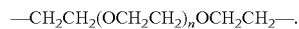

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —R$^a$—Ar$^a$— where R$^a$ is an alkylene and Ar$^a$ is an arylene (i.e., an alkylene is bonded to an arylene).

The term "(meth)acrylate" refers to monomeric acrylic or methacrylic esters of alcohols. Acrylate and methacrylate monomers are referred to collectively herein as "(meth)acrylate" monomers.

The terms "free radically polymerizable" and "ethylenically unsaturated" are used interchangeably and refer to a reactive group which contains a carbon-carbon double bond which is able to be polymerized via a free radical polymerization mechanism.

Unless otherwise indicated, "optically transparent" refers to an article, adhesive, or layer that has a high light transmittance over at least a portion of the visible light spectrum (about 400 to about 700 nm). The term "transparent layer" refers to a layer having a thickness and when the layer is disposed on a substrate, an image (disposed on or adjacent to the substrate) is visible through the thickness of the transparent layer. In many embodiments, a transparent layer allows the image to be seen through the thickness of the coating without substantial loss of image clarity.

Unless otherwise indicated, "optically clear" refers to an adhesive or article that has a high light transmittance over at least a portion of the visible light spectrum (about 400 to about 700 nm), and that exhibits low haze.

As used herein, the term "microstructure" means the configuration of features wherein at least 2 dimensions of the features are microscopic. The topical and/or cross-sectional view of the features must be microscopic.

As used herein, the term "microscopic" refers to features of small enough dimension so as to require an optic aid to the naked eye when viewed from any plane of view to determine its shape. One criterion is found in *Modern Optical Engineering* by W. J. Smith, McGraw-Hill, 1966, pages 104-105 whereby visual acuity is " . . . is defined and measured in terms of the angular size of the smallest character that can be recognized." Normal visual acuity is considered to be when the smallest recognizable letter subtends an angular height of 5 minutes of arc on the retina. At typical working distance of 250 mm (10 inches), this yields a lateral dimension of 0.36 mm (0.0145 inch) for this object.

As used herein, the expressions "permanent microstructure" and "the microstructured pattern is a permanent feature of the adhesive surface" are used interchangeably and mean that the microstructures on the adhesive surface are designed not to disappear or collapse over time. Typically, microstructured adhesive surfaces, especially with optically transparent adhesives, are designed to remain only temporarily to permit air egress and then collapse and disappear.

Disclosed herein are heat-activatable adhesives and articles prepared from heat-activatable adhesives. These articles comprise a substrate with a heat-activatable adhesive disposed on at least one surface.

The heat-activatable adhesives of this disclosure comprise at least one hot melt processable siloxane-based elastomeric polymer. Siloxane polymers have unique properties derived mainly from the physical and chemical characteristics of the siloxane bond. These properties include low glass transition temperature, thermal and oxidative stability, resistance to ultraviolet radiation, low surface energy and hydrophobicity. The siloxane polymers, however, often lack tensile strength.

The low tensile strength of the siloxane polymers can be improved by forming block copolymers. Some block copolymers contain a "soft" siloxane polymeric block or segment and any of a variety of "hard" blocks or segments. Particularly suitable elastomeric siloxane-based elastomeric polymers are the segmented polymers of Formula 1 and Formula 2 below.

The elastomeric siloxane polymers of Formula 1 are an example of a useful class of silicone elastomeric polymers. Formula 1 shows silicone polyurea block copolymers. Silicone polyurea block copolymers include the reaction product of a polydiorganosiloxane diamine (also referred to as a silicone diamine), a diisocyanate, and optionally an organic polyamine. Suitable silicone polyurea block copolymers are represented by the repeating unit of Formula 1:

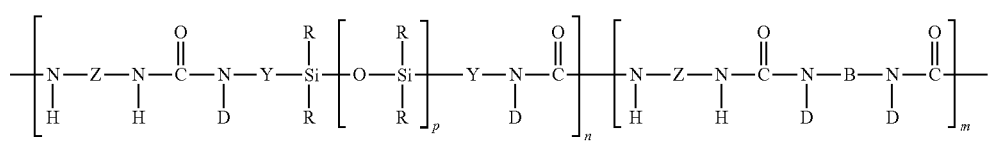

Formula 1 wherein
each R is a moiety that, independently, is an alkyl moiety, having about 1 to 12 carbon atoms, and may be substituted with, for example, trifluoroalkyl or vinyl groups, a vinyl radical or a higher alkenyl radical, a cycloalkyl moiety having from about 6 to 12 carbon atoms and may be substituted with alkyl, fluoroalkyl, and vinyl groups, or an aryl moiety having from about 6 to 20 carbon atoms and may be substituted with, for example, alkyl, cycloalkyl, fluoroalkyl and vinyl groups or R is a perfluoroalkyl group as described in U.S. Pat. No. 5,028,679, or a fluorine-containing group, as described in U.S. Pat. No. 5,236,997, or a perfluoroether-containing group, as described in U.S. Pat. Nos. 4,900,474 and 5,118,775; typically, at least 50% of the R moieties are methyl radicals with the balance being monovalent alkyl or substituted alkyl radicals having from 1 to 12 carbon atoms, alkenyl radicals, phenyl radicals, or substituted phenyl radicals;

each Z is a polyvalent radical that is an arylene radical or an aralkylene radical having from about 6 to 20 carbon atoms, an alkylene or cycloalkylene radical having from about 6 to 20 carbon atoms, in some embodiments Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene and mixtures thereof;

each Y is a polyvalent radical that independently is an alkylene radical of 1 to 10 carbon atoms, an aralkylene radical or an arylene radical having 6 to 20 carbon atoms;

each D is selected from the group consisting of hydrogen, an alkyl radical of 1 to 10 carbon atoms, phenyl, and a radical that completes a ring structure including B or Y to form a heterocycle;

where B is a polyvalent radical selected from the group consisting of alkylene, aralkylene, cycloalkylene, phenylene, heteroalkylene, including for example, polyethylene oxide, polypropylene oxide, polytetramethylene oxide, and copolymers and mixtures thereof;

m is a number that is 0 to about 1000;
n is a number that is at least 1; and
p is a number that is at least 10, in some embodiments 15 to about 2000, or even 30 to 1500.

Useful silicone polyurea block copolymers are disclosed in, e.g., U.S. Pat. Nos. 5,512,650, 5,214,119, 5,461,134, and 7,153,924 and PCT Publication Nos. WO 96/35458, WO 98/17726, WO 96/34028, WO 96/34030 and WO 97/40103.

Another useful class of elastomeric siloxane polymers are oxamide-containing polymers such as polydiorganosiloxane polyoxamide block copolymers. Examples of polydiorganosiloxane polyoxamide block copolymers are presented, for example, in US Patent Publication No. 2007-0148475.

The polydiorganosiloxane polyoxamide block copolymer contains at least two repeat units of Formula 2.

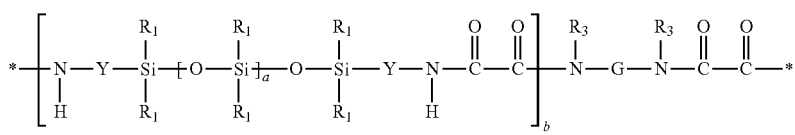

Formula 2

In this formula, each $R_1$ is independently an alkyl, haloalkyl, aralkyl, alkenyl, aryl, or aryl substituted with an alkyl, alkoxy, or halo, wherein at least 50 percent of the $R_1$ groups are methyl. Each Y is independently an alkylene, aralkylene, or a combination thereof. Subscript a is independently an integer of 40 to 1500 and the subscript b is an integer of 1 to 10. Group G is a divalent group that is the residue unit that is equal to a diamine of formula $R_3HN-G-NHR_3$ minus the two $-NHR_3$ groups. Group $R_3$ is hydrogen or alkyl (e.g., an alkyl having 1 to 10, 1 to 6, or 1 to 4 carbon atoms) or $R_3$ taken together with G and with the nitrogen to which they are both attached forms a heterocyclic group (e.g., $R^3HN-G-NHR^3$ is piperazine or the like). Each asterisk (*) indicates a site of attachment of the repeat unit to another group in the copolymer such as, for example, another repeat unit of Formula 2.

Suitable alkyl groups for $R_1$ in Formula 2 typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R_1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R_1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R_1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R_1$ usually have an alkylene group having 1 to 10 carbon atoms and an aryl group having 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

At least 50 percent of the $R_1$ groups are methyl. For example, at least 60 percent, at least 70 percent, at least 80 percent, at least 90 percent, at least 95 percent, at least 98 percent, or at least 99 percent of the $R_1$ groups can be methyl. The remaining $R_1$ groups can be selected from an alkyl having at least two carbon atoms, haloalkyl, aralkyl, alkenyl, aryl, or aryl substituted with an alkyl, alkoxy, or halo.

Each Y in Formula 2 is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group having 6 to 12 carbon atoms bonded to an alkylene group having 1 to 10 carbon atoms.

In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript a in Formula 2 is independently an integer of 40 to 1500. For example, subscript a can be an integer up to 1000, up to 500, up to 400, up to 300, up to 200, up to 100, up to 80, or up to 60. The value of a is often at least 40, at least 45, at least 50, or at least 55. For example, subscript a can be in the range of 40 to 1000, 40 to 500, 50 to 500, 50 to 400, 50 to 300, 50 to 200, 50 to 100, 50 to 80, or 50 to 60.

The subscript b is an integer of 1 to 10. For example, the value of b is often an integer up to 9, up to 8, up to 7, up to 6, up to 5, up to 4, up to 3, or up to 2. The value of b can be in the range of 1 to 8, 1 to 6, or 1 to 4.

Group G in Formula 2 is a residual unit that is equal to a diamine compound of formula $R_3HN-G-NHR_3$ minus the two amino groups (i.e., $-NHR_3$ groups). Group $R_3$ is hydrogen or alkyl (e.g., an alkyl having 1 to 10, 1 to 6, or 1 to 4 carbon atoms) or $R_3$ taken together with G and with the nitrogen to which they are both attached forms a heterocyclic group (e.g., $R_3HN-G-NHR_3$ is piperazine). The diamine can have primary or secondary amino groups. In most embodiments, $R_3$ is hydrogen or an alkyl. In many embodiments, both of the amino groups of the diamine are primary amino groups (i.e., both $R_3$ groups are hydrogen) and the diamine is of formula $H_2N-G-NH_2$.

In some embodiments, G is an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

The polydiorganosiloxane polyoxamide tends to be free of groups having a formula —$R^a$—(CO)—NH— where $R^a$ is an alkylene. All of the carbonylamino groups along the backbone of the copolymeric material are part of an oxalylamino group (i.e., the —(CO)—(CO)—NH— group). That is, any carbonyl group along the backbone of the copolymeric material is bonded to another carbonyl group and is part of an oxalyl group. More specifically, the polydiorganosiloxane polyoxamide has a plurality of aminoxalylamino groups.

An advantage of these hot melt processable siloxane-based elastomeric polymers is that they often can be used by themselves to form heat-activatable adhesives, without the need for additional additives. As mentioned above, these types of hot melt processable siloxane-based elastomeric polymers have been used to prepare pressure sensitive adhesives. However, to prepare pressure sensitive adhesives high levels of tackifying resin are required. Often the levels of added tackifying agent are up to 50% by weight of the total adhesive composition (or expressed another way the pressure sensitive adhesive composition can contain equal parts by weight of elastomer and tackifying agent).

The hot melt processable siloxane-based elastomeric polymers of this disclosure, because they are heat-activatable adhesives, do not require tackification. This means that the coatings of this disclosure are typically free or substantially free of tackifying resin. While tackifying resin can be added to the coating as an optional additive as will be described below, the coatings of this disclosure do not require tackifying resins to produce strong adhesion between the pipe surface and the coating.

That these hot melt processable siloxane-based elastomeric polymers can function as adhesives without requiring tackification is very surprising, since these types of siloxane-based polymers have been used as release agents when no tackifying agent is present. Additionally, U.S. Pat. No. 5,866,222 (Seth et al.) describes the modification of release coatings to give non-tacky coatings with higher release values to, for example, block copolymer-based pressure sensitive adhesives, through the use of 1 to 30 weight percent of MQ tackifying resin. Higher release values means that the pressure sensitive adhesive has a greater adhesion to the coating than to non-modified release coating. Therefore, one would expect that in order to produce an adhesive with hot melt processable siloxane-based elastomeric polymers one would have to add a tackifying resin, and that at a relatively high level. Without tackifying resin, one would expect the hot melt processable siloxane-based elastomeric polymers to function as release agents, not adhesives.

While the heat-activatable adhesives are non-tacky at room temperature, they form strong adhesive bonds to polar substrates such as metals upon heating. Generally the coatings are non-tacky and non-adhesive to polar substrates such as metals at a temperature of less than 50° C. Typically strong adhesive bonds are formed upon heating at a temperature of greater than 50° C. up to a temperature of 10° C. below the decomposition temperature of the siloxane-based elastomeric polymer.

The heat-activatable adhesive may be of any desired thickness. Typically, the heat-activatable layer is from 25.4 micrometers to 2,540 micrometers (1 mil to 100 mils). In some embodiments, such as, for example, the use of the heat-activatable adhesive as a permanently microstructured adhesive article, it may be desirable for the heat-activatable layer to be in the range of 254 micrometers to 2,540 micrometers (10-100 mils), 254 micrometers to 2,032 micrometers (10-80 mils), 254 micrometers to 1.524 micrometers (10-60 mils), or even 254 micrometers to 1,016 micrometers (10-40 mils). More typically, when used as an adhesive, the heat activatable adhesive has a thickness of from 25.4 micrometers to 635 micrometers (1-25 mils), 25.4 micrometers to 254 micrometers (1 mil to 10 mils), or even 25.4 micrometers to 101.6 micrometers (1 mil to 4 mils).

An additional advantage of the hot melt processable siloxane-based elastomeric polymers is that many of them are optically clear. Heat-activatable adhesives made from these polymers may be optically clear or optically transparent. Since the heat-activatable adhesives may comprise fillers or additives that can interfere with the transmission of visible light, the coatings may not as optically clear as the hot melt processable siloxane-based elastomeric polymers, but may be optically transparent. In many embodiments, the heat-activatable adhesive is optically clear.

Other materials can be added for special purposes, including, for example, oils, tackifying agents as discussed above, plasticizers, antioxidants, ultraviolet ("UV") stabilizers, hydrogenated butyl rubber, pigments, curing agents, polymer additives, thickening agents, chain transfer agents and other additives provided that they do not interfere with the desired properties of the heat-activatable adhesive such as, for example, reduce the optical clarity of the adhesive.

A wide variety of substrates are suitable to prepare adhesive articles of this disclosure. Examples of suitable substrates include a rigid or semi-rigid substrate such as the surface of an article, a tape backing, a film, a sheet, or a release liner. In some embodiments, the substrate may have at least one surface that is a polar surface. Examples of materials with polar surfaces include glass, metal, ceramic, or polar polymeric materials.

Examples of rigid and semi-rigid substrates include the surfaces of articles as well as plates, sheets (such as sheets of metal), and the like. Examples of substrates that are the surface of an article include, but are not limited to, the outer surface of non-optical articles as well as optical articles. Examples of non-optical articles include, for example, the outer surface of ceramic articles and the outer surface of metal articles such as a pipe or similar type of device where the heat-activatable adhesive comprises a pipe coating or a portion of a pipe coating. These applications are described in greater detail in the co-pending application titled "SILOXANE-CONTAINING PIPE COATINGS" filed on the same day as the present application. Examples of optical articles include, for example, an electronic display such as liquid crystal display or a cathode ray tube, the outer surface of a window or glazing, the outer surface of an optical component such as a reflector, polarizer, diffraction grating, mirror, or lens, or the like. The substrate can contain polymeric materials, glass materials, ceramic materials, metal-containing materials (e.g., metals or metal oxides), or a combination thereof. Representative examples of polymeric materials include polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes and polypropylenes, polyvinyl chlorides, polyimides, cellulose triacetates, acrylonitrile-butadiene-styrene copolymers, and the like.

Examples of substrates that are tape backings include substrates prepared from a wide range of materials such as nonwoven materials, paper, metal foils, polymeric films such as: polyester films (e.g., PET polyethylene terephthalate); polyolefin films, such as polypropylene (e.g., biaxially oriented polypropylene (BOPP)), polyethylene, and mixtures thereof; polyurea films; polyurethane films; poly(meth)acrylate films; cellulose triacetate films; films prepared form renewable materials such as PLA (poly lactic acid); and the like.

A wide range of films are suitable for use as the substrate in adhesive articles of this disclosure. Besides conventional films such as are described above as tape backings, a wide range of optical films are suitable substrates in embodiments where the heat-activatable adhesives are optically clear. As used herein, the term "optical film" refers to a film that can be used to produce an optical effect. The optical films are typically polymer-containing films that can be a single layer or multiple layers. The optical films are flexible and can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, diffusive films, infrared reflective films, ultraviolet reflective films, reflective polarizer films such as brightness enhancement films and dual brightness enhancement films, absorptive polarizer films, optically clear films, tinted films, dyed films, privacy films such as light-collimating films, and antireflective films, antiglare films, soil resistant films, and antifingerprint films.

In some embodiments the optical film has a coating. In general, coatings are used to enhance the function of the film or provide additional functionality to the film. Examples of coatings include, for example, hardcoats, anti-fog coatings, anti-scratch coatings, privacy coatings, anti-fingerprint coatings, antimicrobial coatings or a combination thereof. Coatings such as hardcoats, anti-fog coatings, and anti-scratch coatings that provide enhanced durability, are desirable in applications such as, for example, touch screen sensors, display screens, graphics applications and the like. Examples of privacy coatings include, for example, blurry or hazy coatings to give obscured viewing or louvered films to limit the viewing angle. Examples of anti-fingerprint coatings include those described in U.S. Patent Application Ser. No. 61/486,000 filed May 13, 2011 titled: "COATING COMPOSITIONS COMPRISING NON-IONIC SURFACTANT EXHIBITING REDUCED FINGERPRINT VISIBILITY" which describes coatings prepared from a curable resin and a non-ionic surfactant. Examples of antimicrobial coatings include those described in U.S. Pat. No. 8,124,169 (Ylitalo et al.) which describe an antimicrobial coating system that includes a film-forming composition and an effective amount of an antimicrobial agent dispersed within the film-forming composition.

In certain embodiments, a coating can be added to the substrate to affect the optical properties of the substrate. An example of such a coating is a low refractive index coating. Examples of such coatings include those described in U.S. Pat. No. 7,374,812 (Mizuno) which describes silicone-modified fluoropolymers that are formed by first dissolving a fluoropolymer having at least one monomer of vinylidene fluoride coupled to a hexafluoropropylene monomer unit in an organic solvent and subsequently reacting the mixture with an amino silane coupling agent to form an aminosilane-modified fluoropolymer. The aminosilane fluoropolymer is subsequently heated and partially condensed with an oligomer of a silane compound including alkoxy silane. These silicone-modified fluoropolymers can be used to provide coatings that have a low refractive index. Coatings or substrates with low refractive index can be particularly useful with the self-wetting, optically clear pressure sensitive adhesive compositions described above, because, as described above, many embodiments of the adhesive compositions have high refractive indices. Therefore, a low refractive index layer can be adjacent to a high refractive index layer to give desirable optical properties such as anti-reflection.

Another class of low refractive index coatings that can be applied to a film or a substrate is porous coatings. These types of coatings are described in a series of patents: U.S. Pat. No. 5,585,186 (Scholz et al.); U.S. Pat. No. 5,873,931 (Scholz et al.); and U.S. Pat. No. 5,753,373 (Scholz et al.), which teach coatings with anti-reflective and anti-fogging properties. Each of these applications utilizes a porous inorganic metal oxide (such as, for example, silicon dioxide) in conjunction with an organic molecule or molecules. In U.S. Pat. No. 5,585,186 a silane or a siloxane oligomer is included, in U.S. Pat. No. 5,873,931 anionic surfactants are included, and in U.S. Pat. No. 5,753,373 polyhydroxy surfactants are included. In these references, the term "porous" refers to the presence of voids between the inorganic metal oxide particles created when the particles pack together. For single layer coatings, it is known that in order to maximize light transmission in air through an optically transparent substrate, and minimize reflection by the substrate, the refractive index of the coating should equal as closely as possible the square root of the refractive index of the substrate and the thickness of the coating should be one-fourth (¼) of the optical wavelength of the incident light. The voids in the coating provide a multiplicity of subwavelength interstices between the metal oxide particles where the refractive index (RI) abruptly changes from that of air (RI=1) to that of the metal oxide particles (e.g., for silica RI=1.44). By adjusting the porosity, a coating having a calculated refractive index (as shown in U.S. Pat. No. 4,816,333 (Lange, et al.)) very close to the square root of the refractive index of the substrate can be created. By utilizing coatings having optimal refractive indices, at coating thicknesses equal to approximately one-fourth the optical wavelength of the incident light, the percent transmission of light through the coated substrate is maximized and reflection is minimized. The voids in the coating are present substantially throughout; however, the coating may vary in density, e.g., the coating may become gradually more porous moving away from the substrate producing a gradient density. Such a gradient density enhances the anti-reflective property of the coating. Generally, the network has a porosity of about 25 to 45 volume percent, more typically about 30 to 40 volume percent, when dried. Porosity may be calculated from the refractive index of the coating according to published procedures such as in W. L. Bragg, A. B. Pippard, Acta Crystallographica, volume 6, page 865 (1953). When the metal oxide is silicon dioxide, this porosity provides a coating having a refractive index of 1.2 to 1.4, or even 1.25 to 1.36, which is approximately equal to the square root of the refractive indices of polyester, polycarbonate, or polymethyl methacrylate substrates. For example, a porous silica coating having a refractive index of 1.25 to 1.36 is capable of providing a highly anti-reflective surface when coated on a polyethylene terephthalate substrate (RI=1.64) at a thickness of 1000-1200 Angstroms.

Some optical films have multiple layers such as multiple layers of polymer-containing materials (e.g., polymers with or without dyes) or multiple layers of metal-containing material and polymeric materials. Some optical films have alternating layers of polymeric material with different refractive indices. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.), and U.S. Pat. No. 5,360,659 (Arends et al.).

In addition to these films, a variety of additional polymeric film substrates are suitable such as, for example, optically clear stretchable films, graphic films, label stock films, transparent conductive films, and light guide films or substrates. Light guides are materials designed to transmit light by total internal reflection (TIR).

Another similar class of materials suitable for use as the substrate in adhesive articles of this disclosure is sheet materials. Sheet materials include decorative, reflective, and graphical sheets, label stock sheets, and the like. The sheet can be any suitable type of material depending on the desired application. Typically, the sheet comprises a nonwoven, paper, or a polymeric film, such as those described above.

In some embodiments, the substrate is a release liner. Any suitable release liner can be used. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. The liner can have a microstructure on its surface that is imparted to the adhesive to form a microstructure on the surface of the adhesive layer. The liner can then be removed to expose an adhesive layer having a microstructured surface.

The adhesive articles of this disclosure may also comprise a second substrate. In these embodiments, the adhesive article comprises a construction of the type: first substrate/adhesive/second substrate. A wide range of second substrates are suitable to prepare these constructions. Any of the above substrates that are suitable as a first substrate are also suitable as a second substrate. In some embodiments, the second substrate comprises at least one polar surface comprising glass, metal, ceramic, or a polar polymeric material.

As will be described in more detail below, the adhesive article may be prepared as an article comprising an adhesive disposed on a substrate, or the adhesive article may be prepared by disposing the adhesive between two substrates simultaneously or nearly simultaneously. Additionally, articles comprising an adhesive disposed on a substrate can be laminated to a second substrate in subsequent step.

In some embodiments, articles of this disclosure are transfer tapes with at least one microstructured surface. The use of transfer tapes to prepare articles with microstructured surfaces is described in Pending US Patent Application titled "MICROSTRUCTURED TRANSFER TAPES" filed Oct. 5, 2011. Typically, transfer tapes are used to adhere two different substrates, that is to say they are used to form three layer laminates that contain: a substrate/transfer tape/a different substrate. Laminates of this type are formed using a wide range of substrates, such as, for example, papers, sheets, films, plates, etc. The transfer tapes of the present disclosure, in contrast, do not generally adhere two different substrates to each other, but rather are adhered to one substrate and have an exposed outer surface that is not adhered to a substrate. This exposed outer surface comprises a microstructured surface. Typically, this microstructured surface is designed to retain its microstructured shape and not to flow or collapse as is common with microstructured adhesive surfaces.

Rather than adhering two different substrates, the transfer tapes of this disclosure are adhered to a substrate to provide a microstructured surface layer to a substrate. This feature can be used to provide a variety of different articles with structured surfaces. Among the types of articles that can be prepared with the transfer tapes of this disclosure are "light guides". Light guides are devices designed to transport light from a light source to a point at some distance with minimal loss. Light is transmitted through a light guide by means of total internal reflection. Light guides are used in a wide array of devices including backlight devices and luminaires.

Backlights, and some luminaires, use a light source to inject light into an input surface of a light guide to produce diffused illumination over an output surface of the light guide. Examples of output surfaces include Liquid Crystal Display (LCD) panels. Many backlight devices such as LCDs utilize Cold Cathode Fluorescent Lamps (CCFL) for backlighting. Recently, manufacturers have begun replacing CCFLs with other types of light sources, such as light-emitting diodes (LEDs), which are more energy efficient and environmentally friendly than CCFLs.

In backlighting applications for display panels, the main difference between CCFLs and LEDs is that CCFLs continuously emit spatial light in a linear manner, while LEDs combine spaced apart single-point light sources arranged into an LED light bar. As such, CCFLs typically provide uniform illumination. LED light bars, on the other hand, generally are made up of arrays including single-point highly efficient LEDs as light sources, and as the distance between adjacent LEDs increases, certain areas directly in front of each LED may appear brighter, and the areas between LEDs appear darker, thereby resulting in non-uniform brightness of the areas of the light guide closest to the LEDs.

This non-uniform brightness issue has been addressed in PCT Publication WO 2011/091026. In this publication, a light guide module is described that includes a light guide having an input surface to receive light. The light guide module also includes a structured surface layer that has a first surface and a second surface, where the first surface is attached to the input surface of the light guide by adhesives, welding, or other suitable technique. The second surface includes microstructures that are operable to spread incident light in the plane of the light guide and is positioned to receive light emitted from an array of light emitting diodes. The PCT publication goes on to describe techniques for light spreading to counteract the non-uniform brightness caused by LEDs by injection molding the input surface to create protrusion or depressions. However, this technique is complicated and may not be particularly effective at creating a microstructured surface, especially on relatively large surfaces, so the techniques taught by the PCT publication, of making a separate structured surface layer and attaching it to the input surface is less desirable than the transfer tape techniques of this disclosure.

In the present disclosure, the transfer tape comprises a heat-activatable adhesive layer that is a structured surface layer. In this way, the structured surface layer is also the adhesive to attach the structured surface layer to the input surface of the light guide. There are numerous advantages to having a transfer tape be the structured surface layer. One advantage is that the transfer tape does not require an additional adhesive layer to adhere the structured surface layer to the input surface. The use of an additional adhesive layer adds two additional interfaces (the interface where the structured surface layer is attached to the adhesive, and the interface where the adhesive is attached to the input surface) for light to pass through. Each interface can produce additional reflection with consequent light loss. Another similar advantage is that unification of the structured surface layer and the adhesive in a single construction means that the unified construction comprises a single material composition. Just as light can be lost at interfaces, light can also be lost through scattering, diffraction, reflection, etc when it passes through layers of different materials. Yet another advantage of using a transfer tape as a structured surface layer, is that the use of a microstructured adhesive layer as the structured surface layer can provide ease of manufacturing and handling. Typically, an adhesive composition is coated onto a structured release surface, such as a release liner, to generate the transfer tape. The transfer tape can then be slit to the desired size and shape, transported to the use site with the microstructured surface protected by the release liner, and applied as a tape to the input surface. Finally, because the transfer tape is an adhesive, it can overlay imperfections in the input surface without requiring that the input surface undergo additional preparation steps such as polishing. Typically, imperfections in the input surface such as scratches, bumps, depressions and the like need to be removed to provide a smooth surface to ensure proper light transmittal. However, since the structured surface layer is an adhesive, the adhesive surface will fill in scratches and depressions and surround bumps on the input surface to overlay these imperfections and, especially if the refractive index of the adhesive is very similar to or matches with the refractive index of the input surface, will make the structured surface layer a part an extension of the input surface and not a separate layer. This attribute simplifies the process steps needed to prepare the light guide and eliminates tedious and expensive polishing steps on the input surface.

An additional advantage of using the heat-activatable adhesives of the present disclosure as the structured surface layer is in the nature of the heat-activatable adhesive itself. Since the adhesive is heat-activatable and non-tacky at ambient and slightly elevated temperatures, the structured surface layer is not only unlikely to flow and change, it is also unlikely to attract dust and other contaminants that could alter the optical properties of the structured surface layer.

Typically, the transfer tapes of this disclosure have desirable optical properties. Besides being optically transparent or optically clear, it can be desirable in some embodiments for the heat-activatable adhesive composition to have a refractive index in the range of 1.4-1.8. This range is selected to match the refractive index of a variety of substrates, specifically light guides. As described above, when the transfer tapes of this disclosure are attached to the input surface of a light guide device, it can be advantageous for the adhesive composition to approximate or even to match the refractive index of the light guide input surface. This matching of refractive index helps eliminate loss of light by reflection as the light passes through the transfer tape/substrate interface.

As mentioned above, one particularly suitable use for the transfer tapes of this disclosure is for use with light guides. For this purpose, the transfer tape is adhered to the input surface of a light guide to provide a microstructured surface layer to the input substrate. The microstructured surface is able to spread incident light from an array of light emitting diodes in the plane of the light guide, as described above and in PCT Publication WO 2011/091026. The many advantages of using a transfer tape to create a microstructured surface on the input surface of a light guide are described above.

Since the microstructured surface of the transfer tape is used to spread incident light, it is desirable that this spread light not be altered in direction as it passes through the remainder of the adhesive layer. In other words, it is desirable that the only redirection of light provided by the adhesive layer be the spreading of light provided by the microstructured surface. For this reason, it is desirable that the adhesive layer be optically transparent or optically clear.

The microstructured surface may comprise a variety of microstructure shapes, including, but not limited to, symmetrical prism, intermittent arc, continuous arc, trapezoidal, lenslets, Fresnel, or sinusoidal shapes.

Also disclosed herein are methods for preparing adhesive articles. These methods include providing a first substrate with a first surface and a second surface, providing the heat activatable adhesive comprising a hot melt processable siloxane-based elastomeric polymer described above, heating the heat-activatable adhesive to a temperature of greater than 50° C. up to a temperature of 10° C. below the decomposition temperature of the siloxane-based elastomeric polymer, applying the heat-activatable adhesive to at least a portion of a surface of the first substrate, and cooling the heat-activatable adhesive to room temperature.

Examples of suitable first substrates are described above. In some embodiments, the first substrate comprises at least one polar surface. The substrate may be made from one or more polar materials, or the substrate may have one or more polar coatings on the surface. Examples of polar materials include glass, metal, ceramic, and polar polymeric materials.

A wide variety of methods are suitable for heating the heat-activatable adhesive. In some embodiments, the heat-activatable adhesive can be heated by hot melt mixing of the hot melt processable siloxane-based elastomeric polymer and any optional additives. A variety of hot melt mixing techniques using a variety of hot melt mixing equipment are suitable for heating the heat-activatable adhesive. Both batch and continuous mixing equipment may be used. Examples of batch methods include those using a BRABENDER (e.g. a BRABENDER PREP CENTER, commercially available from C.W. Brabender Instruments, Inc.; South Hackensack, N.J.) or BANBURY internal mixing and roll milling equipment (e.g. equipment available from Farrel Co.; Ansonia, Conn.). Examples of continuous methods include single screw extruding, twin screw extruding, disk extruding, reciprocating single screw extruding, and pin barrel single screw extruding. Continuous methods can utilize distributive elements, pin mixing elements, static mixing elements, and dispersive elements such as MADDOCK mixing elements and SAXTON mixing elements. A single hot melt mixing apparatus may be used, or a combination of hot melt mixing equipment may be used to prepare the hot melt processable materials of this disclosure. In some embodiments, it may be desirable to use more than one piece of hot melt mixing equipment. For example, one extruder, such as, for example, a single screw extruder, can be used to hot melt process the hot melt processable siloxane-based elastomeric polymer. The output of this extruder can be fed into a second extruder, for example, a twin screw extruder for hot melt mixing with, for example, optional additives.

The output of the hot melt mixing is disposed onto the surface of the first substrate to produce an adhesive coating on the surface of the substrate. The formed coating can be solidified by allowing the coating to cool or by quenching using both direct methods (e.g. chill rolls or water bath) and indirect methods (e.g. air or gas impingement).

The substrate may be premade and coated, such as the surface of an article, a film, a sheet, or a release liner, or the substrate can be prepared simultaneously with the adhesive coating. For example, a film can be simultaneously extruded from one extruder while the heat-activatable adhesive is extruded from a second extruder. In this way, the two hot layers of materials can be contacted and then the entire construction can be allowed to cool.

A wide range of temperatures may be used to heat the heat-activatable adhesives of this disclosure. The selection of a suitable temperature will depend upon a variety of factors. The urea-containing hot melt processable siloxane-based elastomeric polymers tend to be less thermally robust than the oxamide-containing hot melt processable siloxane-based elastomeric polymers, so heat-activatable materials containing them should be handled with greater caution. Factors such as residence time in the hot melt mixing apparatus also needs to be taken into consideration since, for example, if the residence time in an extruder is short, higher temperatures can be tolerated without adversely affecting the polymers. Typically, the coating temperature is greater than 50° C. up to a temperature of 10° C. below the decomposition temperature of the siloxane-based elastomeric polymer.

Additionally, as described above, adhesive articles with two substrates can be prepared by disposing the hot heat-activatable adhesive to two substrates simultaneously or nearly simultaneously. In this context, nearly simultaneously means that the second substrate is contacted to the heat-activatable adhesive coating before the hot heat-activatable coating has cooled to room temperature. An advantage of this simultaneous or nearly simultaneous method is that the heat-activatable adhesive only needs to be heated once to form bonds to the two substrates. In some embodiments where the adhesive article is a transfer tape, the two substrates may be release liners. One or both of the release liners may be a microstructured release liner. Disposing the hot heat-activatable adhesive to a microstructured release liner and then permitting the heat-activatable adhesive to cool will tend to create a microstructured pattern on the surface of the heat-activatable adhesive that is "locked in". By "locked in", it is meant that, unlike with some pressure sensitive adhesives that have a tendency to flow and lose the microstructured pattern on the surface upon removal of the release liner, the microstructured pattern in the heat-activatable adhesive surface tends to remain. Also, even if the heat-activatable adhesive is heated, as long as the microstructured liner is in place, the structures will tend to remain. Thus, adhesive articles comprising a release liner/heat-activatable adhesive/microstructured release liner can be used to generate permanent microstructured surfaces on substrates. This can be achieved by removing the release liner and keeping the microstructured release liner in place, heating the heat-activatable adhesive, adhering the hot heat-activatable adhesive to a surface, permitting the heat-activatable adhesive to cool, and removing the microstructured release liner to expose the microstructured surface.

Adhesive articles comprising two substrates can also be prepared by forming adhesive articles comprising the heat-activatable adhesive disposed on a first substrate, heating the heat-activatable layer and contacting the heat-activatable layer to the surface of a second substrate. The heating of the heat-activatable layer can be done by a variety of methods such as indirect heating using, for example, an oven such as a forced air oven or directly through the use of a heat gun, IR lamp, or similar heat source. In some embodiments, it may be desirable to heat the heat-activatable layer indirectly by heating the second substrate prior to contacting the second substrate to the heat-activatable layer. Additionally, heat can also be applied to the first substrate/adhesive/second substrate construction. In other words, the second substrate may be contacted to the heat-activatable adhesive layer prior to the heating of the heat-activatable layer.

EXAMPLES

Unless otherwise noted, all parts, percentages, ratios, etc. in the Examples and the rest of the specification are by weight. Unless otherwise specified all materials were from J. T. Baker (AVANTOR, Center Valley, Pa.). All glass and aluminum plates used in the examples were used as supplied and had no special surface treatments applied. They were meant to represent a worst case scenario for adhesion. In actual applications etching or priming would be usually be done and the anticipated adhesion would be better.

Materials:

| Abbreviation | Description |
| --- | --- |
| Polyoxamide | Poly(diorganosiloxane)-polyoxamide copolymer made from diamine of 14,000 molecular weight as per "Preparatory Example 1" of U.S. Pat. No. 7,947,376. |
| SPU | A thermoplastic silicone elastomer which contains poly-dimethylsiloxane and urea groups, commercially available under the trade designation "GENIOMER 200" from Wacker Chemical, Adrian, MI. |
| Al | 2024-T3 aluminum plates commercially available from Assurance Manufacturing, Inc., Minneapolis, MN. The plates were used as-received, without any surface treatment and cleaning. The plates had the dimensions of 30 cm × 10 cm × 1 mm. |
| Glass | Glass plates commercially available from Sigma-Aldrich Corp., St. Louis, MO, under the trade name CVS10 GLASS PLATE. The plates were used as-received, without any surface treatment and cleaning |

Test Methods
Relative Adhesion

The relative adhesion was tested by inserting a thin steel plate between the plates and trying to pry the plates apart with a twisting motion. The following rating system was used:
1=easy to separate the plates
3=possible to separate the plates but required effort
9=impossible to separate the plates under the described test condition Peak Peel Force The peak peel force was determined by a T-peel test. The tests were performed with a universal testing machine (Model Sintech 1/G-Tensile Tester) equipped with 5 kN load cell and with self-aligning tensile testing grips available from MTS Systems Corporation, Eden Prairie, Minn. 5 cm-long sections of the unbounded ends of the test specimen were bent by approximately 90° and they were clamped to the tensile testing grips. The tensile load was applied at a constant head speed of 50.8 mm/min (2 in/min).

Example 1

A study was done to determine the relative adhesion to glass of Polyoxamide or SPU as a function of temperature.

Polyoxamide pellets were compression molded between two polytetrafluoroethylene sheets and in an electrically heated press to obtain flat films of approximate thickness of 0.64 mm (25 mils). The temperature of the platens of the press was set to 204° C. (400° F.). The pellets were left on the heated press for 5 minutes dwell time, so that the temperature of the pellets would approximately reach the set temperature of the platens. The films were pressed under a pressure of 1.72 MPa (250 psi). The hot pressed films were immediately quenched in another press, the platens of which were continuously cooled with circulating water at ambient temperature.

SPU pellets were compression molded between two paper backed liners in an electrically heated press to obtain flat films of approximate thickness of 0.13 mm (5 mils). The temperature of the platens of the press was set to 204° C. (400° F.). The films were pressed under a pressure of 1.72 MPa (250 psi). The hot pressed films were immediately quenched in another press, the platens of which were continuously cooled with circulating water at ambient temperature.

The prepared Polyoxamide and SPU films were separately placed between two Glass plates to form a sandwich structure (glass/polymer/glass). The dimensions of Glass plates were 10 cm×10 cm×4 mm. The sandwich structure was then pressed in an electrically heated press. To obtain sandwich structures which were pressed at three different temperatures, temperature of the platens of the press was set to 93° C. (200° F.), 149° C. (300° F.), 204° C. (400° F.). The sandwich structures were left on the heated press for 5 minutes dwell time, so that the temperature of the films would approximately reach the set temperature of the platens. The sandwich structures were pressed under a pressure of 1.72 MPa (250 psi). The hot pressed sandwich structures were left on a laboratory bench to slowly cool at ambient temperature without forced cooling.

The adhesive properties were determined by following the "relative adhesion" test procedure and results are shown in Table 1.

TABLE 1

| | Polymer type | |
|---|---|---|
| Hot Press Temperature | Polyoxamide Relative Adhesion | SPU Relative Adhesion |
| 93° C. (200° F.) | 1 | 1 |
| 149° C. (300° F.) | 9 | 3 |
| 204° C. (400° F.) | 9 | 9 |

Example 2

A study was done to determine the relative adhesion to aluminum of Polyoxamide or SPU as a function of temperature. 3 grams of Polyoxamide or SPU pellets were put between two aluminum (Al) plates to form a sandwich structure (Al/polymer/Al). The pellets were placed on one end of the Al plates to obtain a sandwich structure which was bonded only over approximately 10 cm of its length. The sandwich structure was then pressed in an electrically heated press. To obtain sandwich structures which were pressed at four different temperatures, temperature of the platens of the press was set to ambient, 38° C. (100° F.), 149° C. (300° F.), 204° C. (400° F.). The sandwich structures were left on the heated press for 5 minutes (dwell time), so that the temperature of the pellets would approximately reach the set temperature of the platens. The sandwich structures were pressed under a pressure of 1.72 MPa (250 psi). The hot pressed sandwich structures were immediately quenched in another press, the platens of which were continuously cooled with circulating water at ambient temperature.

The state of bonding was tested by following the "peak peel force" test procedure and results are shown in Table 2. NA=Sample did not allow recording of any significant force value.

TABLE 2

| Compression | Peak peel force (N) | |
|---|---|---|
| Temperature | Al/Polyoxamide/Al | Al/SPU/Al |
| Ambient | 20 | NA |
| 38° C. (100° F.), | 178 | NA |
| 149° C. (300° F.), | 236 | NA |
| 204° C. (400° F.). | 289 | 27 |

What is claimed is:

1. An article comprising;
   a substrate with a first surface and a second surface;
   a heat-activatable adhesive layer disposed on at least a portion of the first surface of the substrate, the heat-activatable adhesive layer comprising:
   a hot melt processable siloxane-based elastomeric polymer, wherein the siloxane-based elastomeric polymer comprises a segmented copolymer of Formula 1 or Formula 2:

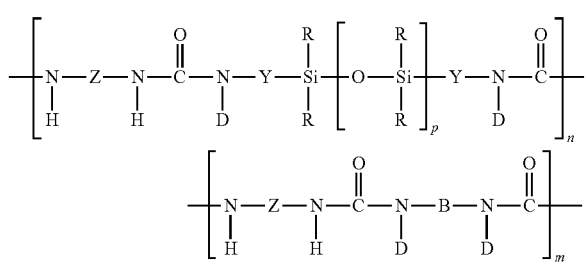

Formula 1 wherein each R is a moiety that, independently, is an alkyl moiety, having about 1 to 12 carbon atoms, and may be substituted with, for example, trifluoroalkyl or vinyl groups, a vinyl radical or a higher alkenyl radical, a cycloalkyl moiety having from about 6 to 12 carbon atoms and may be substituted with alkyl, fluoroalkyl, and vinyl groups, or an aryl moiety having from about 6 to 20 carbon atoms and may be substituted;

each Z is a polyvalent radical that is an arylene radical or an aralkylene radical having from about 6 to 20 carbon atoms, an alkylene or cycloalkylene radical having from about 6 to 20 carbon atoms;

each Y is a polyvalent radical that independently is an alkylene radical of 1 to 10 carbon atoms, an aralkylene radical or an arylene radical having 6 to 20 carbon atoms;

each D is selected from the group consisting of hydrogen, an alkyl radical of 1 to 10 carbon atoms, phenyl, and a radical that completes a ring structure including B or Y to form a heterocycle;

where B is a polyvalent radical selected from the group consisting of alkylene, aralkylene, cycloalkylene, phenylene, heteroalkylene, and copolymers and mixtures thereof;

m is a number that is 0 to about 1000;

n is a number that is at least 1; and p is a number that is at least 10, in some embodiments 15 to about 2000, or even 30 to 1500;

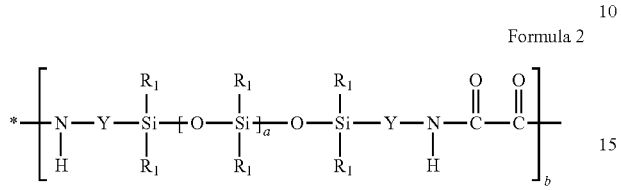

Formula 2

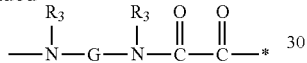

-continued wherein each $R_1$ is independently an alkyl, haloalkyl, aralkyl, alkenyl, aryl, or aryl substituted with an alkyl, alkoxy, or halo;

each Y is independently an alkylene, aralkylene, or a combination thereof;

subscript a is independently an integer of 40 to 1500;

subscript b is an integer of 1 to 10;

G is a divalent group that is the residue unit that is equal to a diamine of formula $R_3HN\text{-}G\text{-}NHR_3$ minus the two —$NHR_3$ groups;

each $R_3$ is hydrogen or an alkyl having 1 to 10 carbon atoms, or $R_3$ taken together with G and with the nitrogen to which they are both attached forms a heterocyclic group;

each asterisk (*) indicates a site of attachment of the repeat unit to another group in the copolymer; and wherein the heat-activatable adhesive is non-tacky and non-adhesive to substrates at a temperature of less than 50° C. and is adhesive to substrates at a temperature of greater than 50° C. up to a temperature of 10° C. below the decomposition temperature of the siloxane-based elastomeric polymer.

2. The article of claim 1, wherein the heat-activatable adhesive is substantially free of tackifying resin.

3. The article of claim 1, wherein the heat-activatable adhesive is optically clear.

4. The article of claim 1, wherein the substrate comprises a rigid or semi-rigid substrate, a sheet, a film, a tape backing, or a release liner.

5. The article of claim 1, further comprising a second substrate.

6. The article of claim 5, wherein the second substrate comprises at least one polar surface.

7. The article of claim 6, wherein the second substrate with at least one polar surface comprises glass, metal, ceramic, or a polar polymeric material.

8. The article of claim 1, wherein the siloxane-based elastomeric polymer comprises a segmented copolymer of Formula 1 or Formula 2 wherein each R or each $R_1$ is a methyl group.

9. The article of claim 4, wherein the substrate comprises a microstructured release liner.

10. A heat-activatable transfer tape comprising:

an optically transparent heat-activatable adhesive layer with a first major surface and a second major surface, the optically transparent heat-activatable adhesive layer comprising:

a siloxane-based elastomeric polymer comprises a segmented copolymer of Formula 1 or Formula 2:

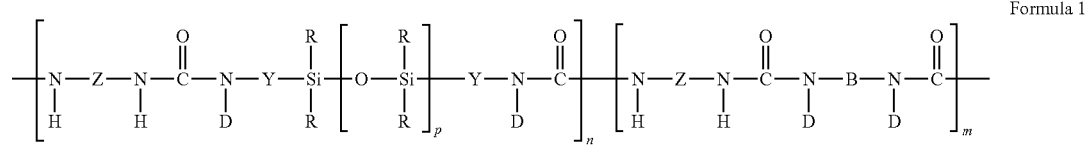

Formula 1 wherein each R is a moiety that, independently, is an alkyl moiety, having about 1 to 12 carbon atoms, and may be substituted with, for example, trifluoroalkyl or vinyl groups, a vinyl radical or a higher alkenyl radical, a cycloalkyl moiety having from about 6 to 12 carbon atoms and may be substituted with alkyl, fluoroalkyl, and vinyl groups, or an aryl moiety having from about 6 to 20 carbon atoms and may be substituted;

each Z is a polyvalent radical that is an arylene radical or an aralkylene radical having from about 6 to 20 carbon atoms, an alkylene or cycloalkylene radical having from about 6 to 20 carbon atoms;

each Y is a polyvalent radical that independently is an alkylene radical of 1 to 10 carbon atoms, an aralkylene radical or an arylene radical having 6 to 20 carbon atoms;

each D is selected from the group consisting of hydrogen, an alkyl radical of 1 to 10 carbon atoms, phenyl, and a radical that completes a ring structure including B or Y to form a heterocycle;

where B is a polyvalent radical selected from the group consisting of alkylene, aralkylene, cycloalkylene, phenylene, heteroalkylene, and copolymers and mixtures thereof;

m is a number that is 0 to about 1000;

n is a number that is at least 1; and p is a number that is at least 10, in some embodiments 15 to about 2000, or even 30 to 1500;

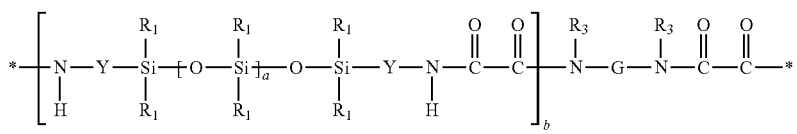

Formula 2 wherein each $R_1$ is independently an alkyl, haloalkyl, aralkyl, alkenyl, aryl, or aryl substituted with an alkyl, alkoxy, or halo;

each Y is independently an alkylene, aralkylene, or a combination thereof;

subscript a is independently an integer of 40 to 1500;

subscript b is an integer of 1 to 10;

G is a divalent group that is the residue unit that is equal to a diamine of formula $R_3HN\text{-}G\text{-}NHR_3$ minus the two —$NHR_3$ groups;

each $R_3$ is hydrogen or an alkyl having 1 to 10 carbon atoms, or $R_3$ taken together with G and with the nitrogen to which they are both attached forms a heterocyclic group;

each asterisk (*) indicates a site of attachment of the repeat unit to another group in the copolymer; and wherein the heat-activatable adhesive is non-tacky and non-adhesive to substrates at a temperature of less than 50° C. and is adhesive to substrates at a temperature of greater than 50° C. up to a temperature of 10° C. below the decomposition temperature of the siloxane-based elastomeric polymer;

and wherein at least one of the first major surface or the second major surface comprises a microstructured pattern on the surface such that the microstructured pattern is a permanent feature of the adhesive surface, and wherein the microstructured surface alters the direction of light.

11. The transfer tape of claim 10, wherein the heat-activatable adhesive layer has refractive index in the range of 1.4-1.8.

12. A method of preparing an adhesive article comprising:
providing a first substrate with a first surface and a second surface;

providing a heat-activatable adhesive, wherein the heat-activatable adhesive comprises:
a hot melt processable siloxane-based elastomeric polymer, wherein the siloxane-based elastomeric polymer comprises a segmented copolymer of Formula 1 or Formula 2:

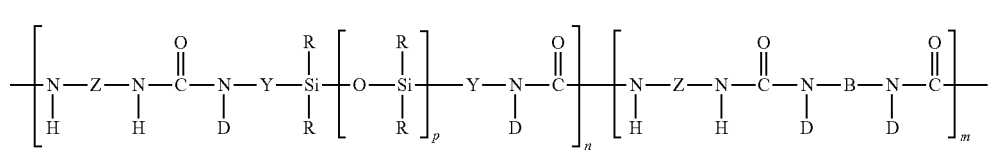

Formula 1 wherein each R is a moiety that, independently, is an alkyl moiety, having about 1 to 12 carbon atoms, and may be substituted with, for example, trifluoroalkyl or vinyl groups, a vinyl radical or a higher alkenyl radical, a cycloalkyl moiety having from about 6 to 12 carbon atoms and may be substituted with alkyl, fluoroalkyl, and vinyl groups, or an aryl moiety having from about 6 to 20 carbon atoms and may be substituted;

each Z is a polyvalent radical that is an arylene radical or an aralkylene radical having from about 6 to 20 carbon atoms, an alkylene or cycloalkylene radical having from about 6 to 20 carbon atoms;

each Y is a polyvalent radical that independently is an alkylene radical of 1 to 10 carbon atoms, an aralkylene radical or an arylene radical having 6 to 20 carbon atoms;

each D is selected from the group consisting of hydrogen, an alkyl radical of 1 to 10 carbon atoms, phenyl, and a radical that completes a ring structure including B or Y to form a heterocycle;

where B is a polyvalent radical selected from the group consisting of alkylene, aralkylene, cycloalkylene, phenylene, heteroalkylene, and copolymers and mixtures thereof;

m is a number that is 0 to about 1000;

n is a number that is at least 1; and p is a number that is at least 10, in some embodiments 15 to about 2000, or even 30 to 1500;

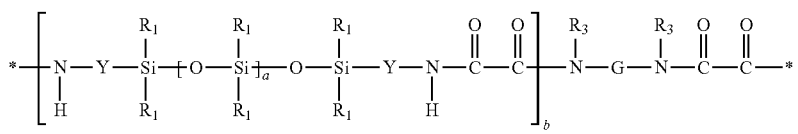

Formula 2 wherein each $R_1$ is independently an alkyl, haloalkyl, aralkyl, alkenyl, aryl, or aryl substituted with an alkyl, alkoxy, or halo;
each Y is independently an alkylene, aralkylene, or a combination thereof;
subscript a is independently an integer of 40 to 1500;
subscript b is an integer of 1 to 10;
G is a divalent group that is the residue unit that is equal to a diamine of formula $R_3HN-G-NHR_3$ minus the two —$NHR_3$ groups;
each $R_3$ is hydrogen or an alkyl having 1 to 10 carbon atoms, or $R_3$ taken together with G and with the nitrogen to which they are both attached forms a heterocyclic group;
each asterisk (*) indicates a site of attachment of the repeat unit to another group in the copolymer; and
wherein the heat-activatable adhesive is non-tacky and non-adhesive to substrates at a temperature of less than 50° C. and is adhesive to substrates at a temperature of greater than 50° C. up to a temperature of 10° C. below the decomposition temperature of the siloxane-based elastomeric polymer;
heating the heat-activatable adhesive to a temperature of greater than 50° C. up to a temperature of 10° C. below the decomposition temperature of the siloxane-based elastomeric polymer;
applying the heat-activatable adhesive to at least a portion of the surface of the first substrate; and
cooling the heat-activatable adhesive to room temperature.

13. The method of claim 12, wherein the heat-activatable adhesive is substantially free of tackifying resin.

14. The method of claim 12, wherein the first substrate comprises rigid or semi-rigid substrate, a sheet, a film, a tape backing, or a release liner.

15. The method of claim 12, wherein the first substrate comprises at least one polar surface wherein the at least one polar surface comprises glass, metal, ceramic, or a polar polymeric material.

16. The method of claim 12, wherein in heating the heat-activatable adhesive comprises hot melt mixing.

17. The method of claim 16, wherein hot melt mixing comprises mixing in an extruder and applying the heat-activatable adhesive to at least a portion of the surface of the first substrate comprises extruding.

18. The method of claim 12, further comprising contacting a second substrate to the applied heat-activatable adhesive prior to cooling.

19. The method of claim 12, further comprising contacting a second substrate to the heat-activatable adhesive after cooling.

20. The method of claim 19, further comprising heating the heat-activatable adhesive to temperature of greater than 50° C. up to a temperature of 10° C. below the decomposition temperature of the siloxane-based elastomeric polymer, either prior to contacting the second substrate to the heat-activatable adhesive or after contacting the second substrate to the heat-activatable adhesive.

21. The method of claim 12, wherein the applied heat-activatable adhesive has a thickness of from 25.4 micrometers to 254 micrometers (1 mil to 10 mils).

22. The method of claim 20, wherein the first substrate comprises a microstructured release liner and the second substrate comprises a light guide, and further comprising cooling the heat-activatable adhesive and removing the first substrate to expose a microstructured surface.

* * * * *

UNITED STATES PATENT AND TRADEMARK OFFICE
CERTIFICATE OF CORRECTION

PATENT NO. : 10,239,301 B2
APPLICATION NO. : 14/572993
DATED : March 26, 2019
INVENTOR(S) : Audrey Sherman Page 1 of 1

It is certified that error appears in the above-identified patent and that said Letters Patent is hereby corrected as shown below:

On the Title Page

Column 2 (Abstract)
Line 8, Delete "50 C." and insert -- 50° C. --, therefor.

In the Specification

Column 6
Line 17, Delete "calorimetry" and insert -- Calorimetry --, therefor.

Column 8
Line 32-33, Delete "poloxyyalkylenes" and insert -- polyoxyalkylenes --, therefor.

Column 14
Line 48, After "application" insert -- with docket number 69889US002 --.

Column 17
Line 61, After "Application" insert -- Docket No. 67249US002 --.

Signed and Sealed this
Twenty-ninth Day of October, 2019

Andrei Iancu
*Director of the United States Patent and Trademark Office*